United States Patent [19]

Thompson

[11] 4,177,836

[45] Dec. 11, 1979

[54] DISPOSABLE PRESSURE VESSEL

[75] Inventor: James E. Thompson, Cedar Falls, Iowa

[73] Assignee: Deere & Company, Moline, Ill.

[21] Appl. No.: 953,692

[22] Filed: Oct. 23, 1978

[51] Int. Cl.[2] .............................................. F16L 55/04

[52] U.S. Cl. ........................................ 138/30; 220/67; 220/309; 138/89

[58] Field of Search ........................ 138/26, 30, 31, 89; 220/85 B, 66, 67, 309, 310; 215/355

[56] References Cited

U.S. PATENT DOCUMENTS

| | | | |
|---|---|---|---|
| 2,995,009 | 8/1961 | Rush | 220/309 |
| 3,168,907 | 2/1965 | Mercier et al. | 138/30 |
| 3,288,168 | 11/1966 | Mercier et al. | 138/30 |
| 3,695,298 | 10/1972 | Zahid | 138/30 |
| 3,960,178 | 6/1976 | Mercier | 138/30 |

FOREIGN PATENT DOCUMENTS

| | | | |
|---|---|---|---|
| 670409 | 4/1952 | United Kingdom | 138/89 |

*Primary Examiner*—Richard E. Aegerter
*Assistant Examiner*—James E. Bryant, III

[57] ABSTRACT

A disposable pressure vessel includes a gas valve containing cylindrical cap encircled by an O-ring. The cap is bonded to an annular flared portion of a generally cylindrical rubber bladder and is disposed in a hollow cylindrical housing such that the cap compresses the flanged portion of the bladder against a shoulder in the cylindrical housing. The cap is held in place by three equally circumferentially spaced, lanced portions of the cylindrical housing and the O-ring seals the interior of the cylindrical housing from the exterior.

4 Claims, 2 Drawing Figures

DISPOSABLE PRESSURE VESSEL

BACKGROUND OF THE INVENTION

The present invention relates generally to very inexpensive accumulators which may be disposed of rather than repaired when they fail.

In the past, disposable accumulators typically depended on squeeze on the bladder or continuous bead welding to seal the gas and the fluid of the accumulator from the atmosphere. Expensive threaded or rolled connections were used to provide for squeeze on the bladder for sealing, but pulsation and flexing of the bladder tended to generate leakage when the seal was dependent of squeeze. Continuous bead welding provided an acceptable seal, but was a difficult process to control and often resulted in thermal damage to the bladder during the manufacturing process.

The present invention provides a positive gas and fluid seal while reducing the manufacturing cost.

The above and additional advantages of the present invention will become apparent to those skilled in the art from a reading of the following detailed description when taken in conjunction with the acompanying drawings.

DESCRIPTION OF THE PREFERRED EMBODIMENT

Figure 1:
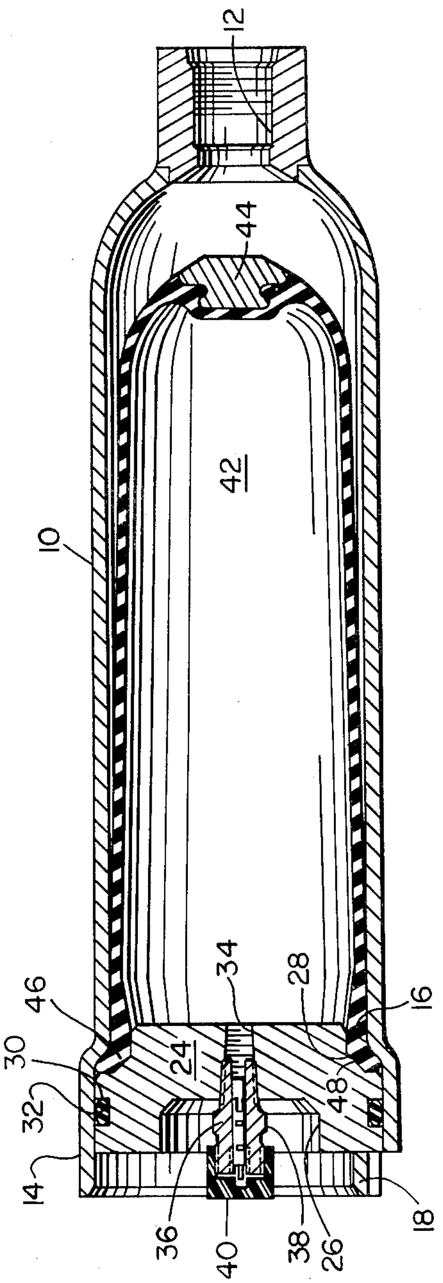
FIG. 1 is a cross-sectional view taken along line 1—1 of FIG. 2 of a disposable accumulator embodying the present invention.
Figure 2:
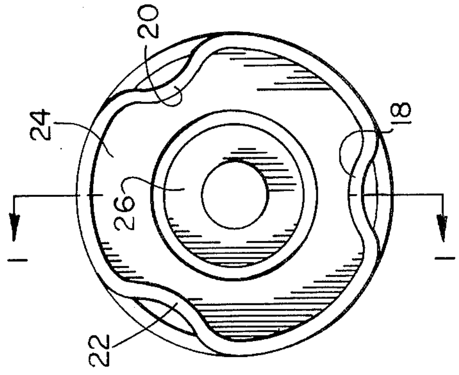
FIG. 2 is a top view of the accumulator showing a portion of the present invention.

Referring now to FIG. 1, therein is shown a disposable accumulator having a cylindrical housing 10 which has a port 12 at one end and an enlarged diameter 14 at the other. The enlarged diameter has an interior annular shoulder 16 and has three circumferentially equally spaced interiorly offset areas generally designated as lanced portions 18, 20 and 22 against which an end cap 24 abuts.

The end cap 24 has a cylindrical configuration with an interior counterbore 26 and an exterior annular shoulder 28. The outer circumference of the end cap 24 is provided with an O-ring groove 30 in which a conventional O-ring 32 is disposed to seal any clearances between the end cap 24 and the cylindrical housing 10.

The end cap 24 further has a through hole which is threaded and designated as threaded hold 34. The threaded hole 34 threadedly engages a conventional gas valve 36. The gas valve 36 is normally closed to prevent the flow of pressurized gas therethrough and is openable to allow the passage of pressurized gas in either direction through the theaded hole 34. The gas valve 36 further has a nut portion 38 by which it may be threaded into the end cap 24. A protective cover 40 provides a positive seal of gas valve 36 from the atmosphere. The top portion of the gas valve 36 is totally disposed within the cylindrical housing 10.

A generally cylindrical bladder 42 is disposed within the cylindrical housing 10. The bladder 42 has a bladder extrusion preventer 44 at one end which prevents extrusion of the bladder 42 through the port 12 when the pressure is higher therein than in the port 12. The end of the bladder 42 opposite the bladder extrusion preventer 44 has an axially outwardly flared portion 46 the interior of which defines a bond area 48 through which the bladder 42 is bonded by conventional means to the end cap 24.

The disposable accumulator is inexpensive and effective because it is easy to assemble while avoiding leakage. The end cap 24 with the bladder 42 bonded to it is inserted in the cylindrical housing 10. A load is then applied to the end cap 24 to cause the flared portion 46 of the bladder 42 to compress between the annular shoulder 28 of the end cap 24 and the annular shoulder 16 of the cylindrical housing 10. The exact positioning of the end cap 24 is not critical as long as it is below the lanced portions 18, 20, and 22 which may then be formed on conventional metal lancing machinery. The conventional metal lancing machinery may take the form of a plurality of crimping tools which are forced against the housing with sufficient force to simultaneously shear and deform the housing to provide the lanced portions 18, 20 and 22. When the load is released on the end cap 24, it abuts the bottom of the lanced portions 18, 20, and 22 and prevents any further increase in the distance between the annular shoulders 16 and 28. While fluid may seep past the annular shoulder 16 in the flared portion 46, the O-ring 32 will block passage of fluid to the atmosphere. Similarly, the leakage of any gas in the bond area 48 will be stopped by the sealing compression of the flared portion 46 and the angular shoulder 160 of the cylindrical housing 10.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A pressure vessel comprising: a cylindrical cap member having an axially extending through hole provided therein, said cylindrical cap member having an exteriorly disposed annular shoulder provided therein around the periphery thereof; a normally closed gas valve disposed in blocking position in said through hole openable to allow bidirectional flow of gas through said through hole; a generally cylindrical bladder of a resilient deformable material having a closed end and an open end, said open end having an annular flared portion bonded to said exteriorly disposed annular shoulder of said cylindrical cap member which blocks said open end of said generally cylindrical bladder; and a rigidly cylindrical housing having a closed end and an open end, said closed end having a port provided therein and said open end having an interiorly disposed annular shoulder portion provided therein around the periphery thereof, said housing sized to contain said generally cylindrical bladder and said cylindrical cap member therein with said annular flared portion of said generally cylindrical bladder abutting said interiorly disposed annular shoulder portion of said cylindrical housing and with said cylindrical cap member blocking said open end to enclose said generally cylindrical bladder in said cylindrical housing, said interiorly disposed annular shoulder portion of said cylindrical housing including at least one interiorly offset lanced portion positioned to hold said cylindrical cap member in juxtaposition compressing said flared portion of said generally cylindrical bladder between said interiorly disposed annular shoulder of said cylindrical housing and said exteriorly disposed annular shoulder of said cylindrical cap member.

2. The pressure vessel as claimed in claim 1 wherein said cylindrical cap member has an annular groove provided therein encircling the periphery thereof and including an O-ring disposed in said annular groove to define a seal between said cylindrical cap member and said cylindrical housing.

3. The pressure vessel as claimed in claim 2 wherein said interiorly disposed annular shoulder portion includes three circumferentially equally spaced interiorly offset lanced portions.

4. A pressure vessel comprising: a cylindrical cap member having an axially extending counterbore provided therein connected to an axially extending through hole provided therein, said cylindrical cap member having an exteriorly disposed annular shoulder provided therein around the periphery thereof distal from said counterbore and having an annular groove provided therein encircling the periphery thereof; a normally-closed gas valve disposed in said cylindrical cap member to block said through hole openable to allow bidirectional flow of pressurized gas through said through hole, said gas valve including means disposed in said counterbore for inserting said gas valve in said through hole and means extending from said counterbore for securing a pressurized gas connection thereto; a generally cylindrical bladder of resilient deformable material having a closed end and an open end, said open end having an annular axially outwardly flared portion bonded to said exteriorly disposed annular shoulder of said cylindrical cap member which seals said open end of said generally cylindrical bladder; a rigid cylindrical housing having a closed end and an open end, said closed end having a port provided therein and said open end having an enlarged portion defining an interiorly disposed annular shoulder around the periphery of said opening, said housing sized to contain said generally cylindrical bladder and said cylindrical cap member therein with said annular axially outwardly flared portion of said generally cylindrical bladder abutting said interiorly disposed annular shoulder and with said cylindrical cap member blocking said open end to enclose said generally cylindrical bladder in said cylindrical housing, said enlarged portion of said cylindrical housing including a plurality of interiorly offset lanced portions positioned to hold said cylindrical cap member in juxtaposition compressing said annular axially outwardly flared portion of said generally cylindrical bladder between said interiorly disposed annular shoulder of said cylindrical housing and said exteriorly disposed annular shoulder of said cylindrical cap member, said plurality of interiorly offset lanced portions positioned to encircle said gas valve; and an O-ring disposed in said annular groove in said cylindrical cap member to seal between said cylindrical cap member and said cylindrical housing.

* * * * *